United States Patent [19]

Walker

[11] Patent Number: 4,489,764

[45] Date of Patent: Dec. 25, 1984

[54] ARRANGEMENT FOR FORMING AND TRANSFERRING COILS FOR SUBSEQUENT INSERTION INTO A SLOTTED MAGNETIC CORE

[75] Inventor: Robert G. Walker, Ossian, Ind.

[73] Assignee: Industra Products, Inc., Fort Wayne, Ind.

[21] Appl. No.: 429,323

[22] Filed: Sep. 30, 1982

[51] Int. Cl.³ .............................................. B21F 3/04
[52] U.S. Cl. ..................................... 140/92.1; 29/732
[58] Field of Search ................. 140/92.1; 29/732, 736

[56] References Cited

U.S. PATENT DOCUMENTS

| 3,628,238 | 12/1971 | Hill ...................................... | 140/92.1 |
| 3,686,735 | 8/1972 | Hill et al. ............................ | 140/92.1 |
| 4,221,243 | 9/1980 | Muskulus ........................... | 140/92.1 |
| 4,391,306 | 7/1983 | Hamane et al. .................... | 140/92.1 |

*Primary Examiner*—Lowell A. Larson
*Attorney, Agent, or Firm*—Jeffers, Irish & Hoffman

[57] ABSTRACT

A coil winding and inserting device of the type where a coil form is engaged by coil placer tooling and a flyer revolves about that form generating coil turns while previously formed turns migrate along the coil form and into the placer tooling has an improved arrangement for maintaining formed coils in position within the coil placer tooling comprising spring biased pins located about the periphery of the coil placer tooling for restricting unwinding of the coils while those coils reside in the coil placer tooling as well as wire spring members tending to restrict coil expansion axially toward the coil form and flyer. An improved wire transfer assisting arrangement is also disclosed including a coil pusher for engaging and urging any remaining coils from the form toward the placer tooling subsequent to winding with that coil pusher including a portion for engaging and maintaining the separation between selected adjacent pairs of finger elements of the placer tooling as well as outrigger portions for engaging certain ones of the coils to ensure that they are properly positioned relative to the arrangement for restricting unwinding. Actuation of the coil pusher also allows the coil form to collapse somewhat under the force of the remaining turns on that form to relieve the tension in those turns and allow their ready transfer to the placer tooling.

44 Claims, 10 Drawing Figures

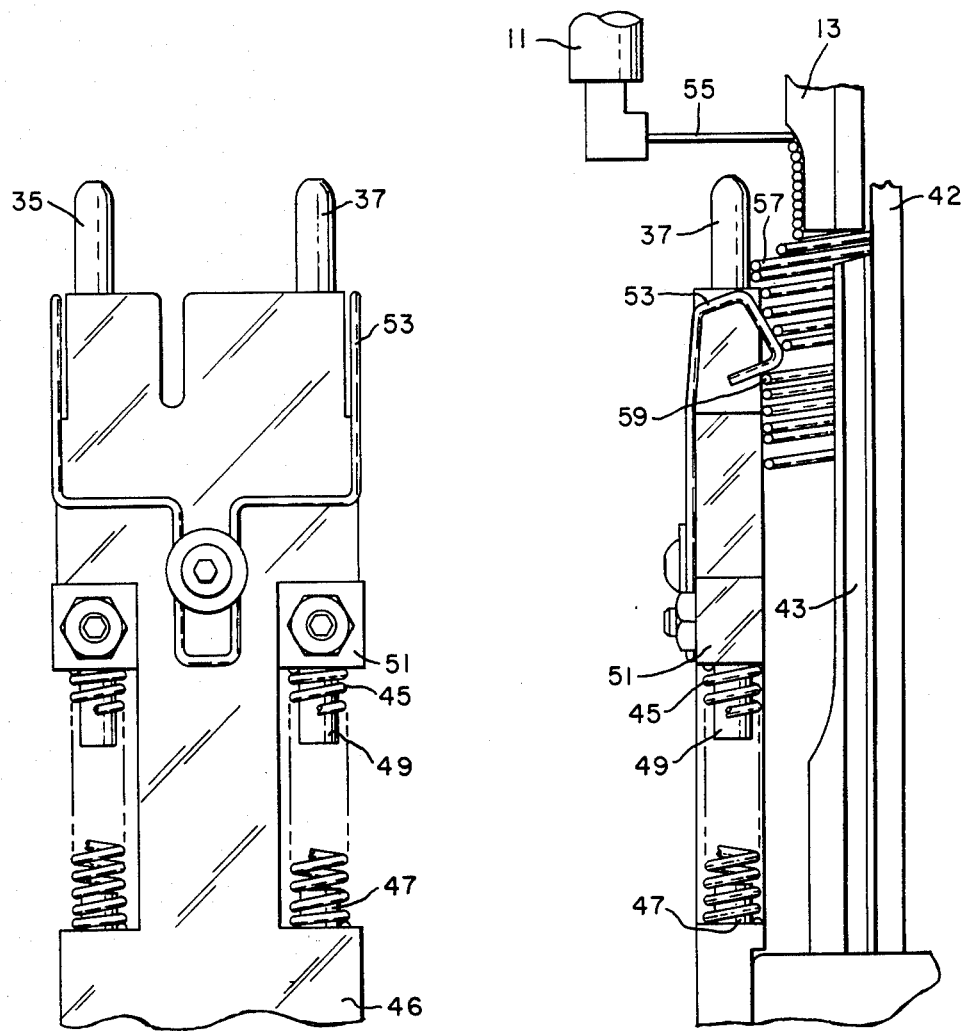
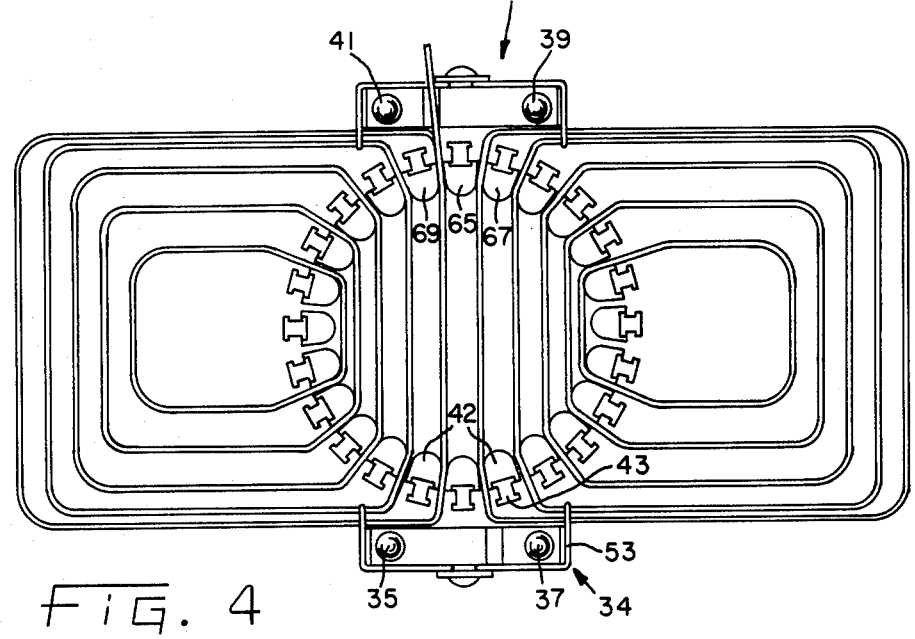

ARRANGEMENT FOR FORMING AND TRANSFERRING COILS FOR SUBSEQUENT INSERTION INTO A SLOTTED MAGNETIC CORE

BACKGROUND OF THE INVENTION

The present invention relates generally to methods and devices for creating and transferring coils preparatory to placing those coils in magnetic cores, and more particularly to improvements in such methods and devices which facilitate the transfer of those coils from coil forms to coil placer tooling and the subsequent holding of those coils in the proper position within the coil placer tooling until those coils are inserted in the cores.

A number of machines have been devised for inserting prewound coils as well as, optionally, insulating wedges into slotted magnetic stator cores. Illustrative of such machines are the Hill U.S. Pat. No. 3,324,536 and Walker et al, U.S. Pat. No. 3,402,462. Coil placing machines of this type typically include a plurality of generally parallel extending finger elements for supporting coils and a magnetic core into which the coils are to be placed along with a plurality of wedge guides adjacent portions of the finger elements for engaging the magnetic core. A stripper is reciprocable along finger elements to engage and move the coils into the magnetic core and insulating wedge push rods are reciprocable along the wedge guides to engage and force insulating wedges into the core slots radially inwardly of the coils.

Frequently, coil placing machines of the above-referenced type form a part only of a more complex coil winding and placing device as illustrated for example by U.S. Pat. Nos. 3,625,261 and 3,828,830 both to Hill et al as well as co-pending U.S. application Ser. No. 294,210, filed Aug. 17, 1981, in the name of Witwer, et al, and co-pending application Ser. No. 429,470, filed Sep. 30, 1982, in the names of Witwer and Walker, entitled "Method and Apparatus for Placing Coils and Intermediate Insulators in Cores.

The winding station or portion of such complex coil winding and placing devices may, for example, take the form illustrated generally in U.S. Pat. No. 3,672,040 to Arnold wherein a wire dispensing flyer revolves about a coil form in a fixed path defining a wire dispensing plane with coil placer tooling engaging the coil form and the coil form being stepped and moveable in increments relative to the flyer to form coils of varying size and with the wire migrating along the coil form and into the coil placer tooling while further coil turns are being formed on the coil form. In some cases, difficulty in transferring all the coil turns from the form to the placer tooling in this last-mentioned type arrangement is experienced and further maintaining the coils in proper position within the placer tooling until those coils are transferred to a stator core is sometimes difficult.

Other types of coil generating devices are known where the complete set of coils for at least one pole of a dynamoelectric machine stator and frequently for all poles of such a machine are wound about coil forms and then the coil forms are appropriately mated with either a coil transfer device or coil placer tooling, whereupon the coil form or forms are collapsed somewhat to facilitate the transfer of the wound coils from the forms to the coil receiving mechanism. Systems of the type where the coil is completely wound and then transferred are illustrated in U.S. Pat. Nos. 3,415,292; 3,508,316; 3,628,238; and 3,628,575. While collapsing of the coil form is commonplace in this last-mentioned type arrangement, it has not heretofore been attempted in winding arrangements where coils are being generated at the same time as previously generated winding turns are being transferred to a coil receiving device.

While the first commercial embodiment of the present invention is presently contemplated as being a part of a somewhat simplified version of the first-mentioned Witwer et al machine relating primarily to the winding station and the last-mentioned Witwer and Walker application relating primarily to the coil inserting station, the principles and techniques of the present invention are applicable to a wide variety of coil placing devices of the types referred to above as well as others. Reference may be had to any of the aforementioned patents for details of the machine operation generally.

SUMMARY OF THE INVENTION

Among the several objects of the present invention may be noted the overall reduction in dynamoelectric machine assembly time; the provision of methods and apparatuses to: facilitate the transfer of coils from a coil former to a coil placer; retain such transferred coils in proper position on the coil placer preparatory to insertion in a dynamoelectric machine stator core; insure that the transfer of one pole group does not impede the transfer of subsequent pole groups to the coil placer; and eliminate one or more of the above noted prior art deficiencies. These as well as other objects and advantageous features of the present invention will be in part apparent and in part pointed out hereinafter.

In general, a coil placing device includes a yieldable coil retaining arrangement positioned radially outwardly of the circular pattern of the coil placer finger elements for reducing the likelihood of stress induced coil distortion prior to movement of the coils into a core. The yieldable arrangement may include a resilient coil retainer for retarding axial coil movement and a plurality of spring biased pins extending generally parallel to and disposed generally radially outwardly of that circular pattern. The pins may extend into a region normally occupied by a stator core when receiving coils with those pins being displaced from that region by a core when the core is positioned to engage the finger elements.

Also in general and in one form of the invention an improved wire transfer assisting arrangement includes a coil pusher for engaging and urging coils from a coil form toward coil placer tooling having a portion thereof for engaging and maintaining the separation between selected adjacent pairs of finger elements of the coil placer tooling. The coil pusher portion may comprise a centrally supported laterally extending member moveable with the coil pusher and having a pair of fins at each of the opposite free ends thereof with each fin passing between adjacent finger elements as the coil pusher urges coils toward the placer tooling with one fin of each pair passing between adjacent finger elements which are receiving coils while the other fin of each pair passes between adjacent pairs of finger elements not receiving coils so as to insure that the placer tooling is not distorted by the coils.

Still further in general and in one form of the invention, in a coil forming device of the type where the transfer of coil turns from a coil form and the generating of subsequent coil turns about the coil form is occurring at the same time, the transferring of coils is improved by collapsing the coil form upon completion of coil generation to induce slack in any coils formed but not transferred whereupon transfer of the coils is completed. The coil form may include two portions relatively moveable between expanded and collapsed positions and biased toward the expanded position with an arrangement normally locking the coil form in the expanded position which is temporarily released to allow the tension of coil turns on the form to collapse the form against the biasing force with the biasing force then restoring the form to its expanded position after coil transfer.

BRIEF DESCRIPTION OF THE DRAWING

FIG. 2 is a side elevation view of a portion of the coil placer tooling and the coil retaining arrangement;

FIG. 3 is a view of the coil retainer of FIG. 2 as seen from the left side thereof;

FIG. 4 is a plan view of the coil placer tooling with a pair of retainers as illustrated in FIGS. 2 and 3 adjacent thereto and exemplary coils received therein;

Corresponding reference characters indicate corresponding parts throughout the several views of the drawing.

The exemplifications set out herein illustrate a preferred embodiment of the invention in one form thereof and such exemplifications are not to be construed as limiting in any manner the scope of the disclosure or the scope of the invention.

DETAILED DESCRIPTION OF THE PREFERRED EMBODIMENT

Figure 1:
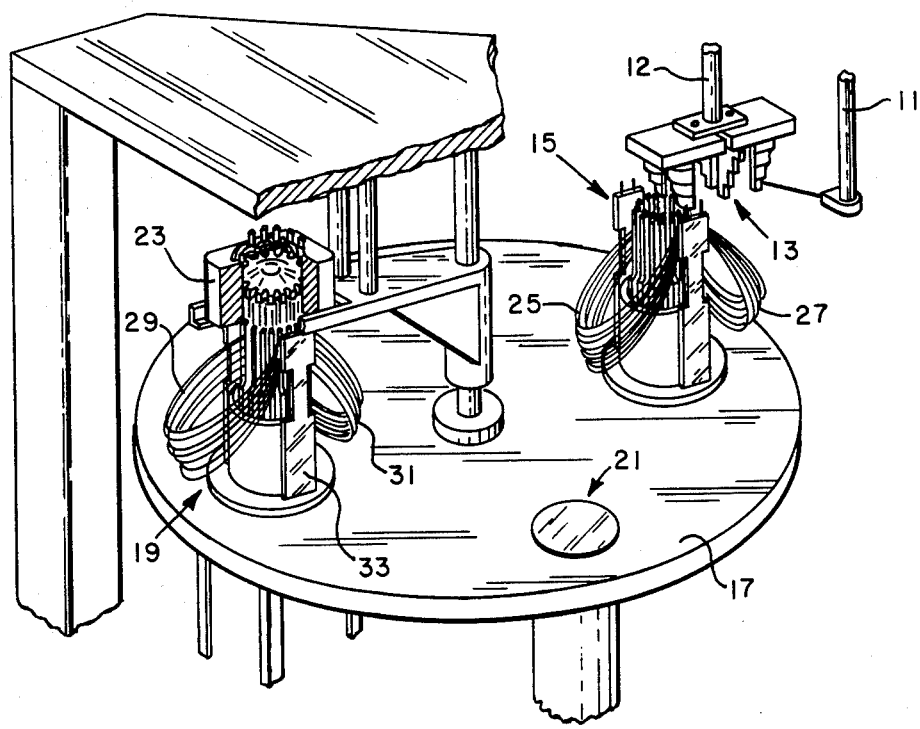
FIG. 1 is a somewhat simplified perspective view of a machine for forming transferring and inserting coils into magnetic cores embodying the present invention.

Referring first to FIG. 1, a flyer 11 is rotatable about a coil form 13 to generate windings thereon and those windings slide downwardly into engagement with coil placer tooling 15. The coil placer tooling may be supported on a turntable 17 which in turn may support one or more other sets of coil placer tooling such as 19. The turntable 17 functions to move the placer tooling 15 between the winding station, a station such as 21 where insulating wedges are formed and positioned between wedge guides in the placer tooling and the station where placing tooling 19 is located for inserting the coils into a magnetic core 23. For exemplary purposes, the fabrication of a two pole split phase induction motor stator is illustrated with the placer tooling 15 supporting the main or running windings comprising two sets of coils or pole groups 25 and 27. Similarly, at the coil inserting station two pole groups 29 and 31 are depicted. It will be understood that at the winding station the set of coils 25 was generated and transferred to the tooling 15 whereupon the coil form 13 was raised and the tooling 15 indexed 180° whereupon coil group 27 was generated and transferred to the tooling 15. The windings and particularly the outermost coils of sets 25 and 27 are retained in position by coil retaining devices such as 33, the details of which are illustrated in FIGS. 2, 3 and 4.

Referring now to FIGS. 2, 3 and 4, the coil retainer 33 and a similar coil retainer 34 are seen to include a plurality of pins 35, 37, 39 and 41 located about the periphery of the coil placer tooling 15 and extending generally parallel to the placer tooling finger elements such as 42 and corresponding wedge guides such as 43. The pins are spring biased upwardly as viewed by corresponding coil springs such as 45 which abut the framework or bracket 46 of the retainer and are held in position by studs such as 47 at one end of the spring 45 and a portion 49 of the pin and a corresponding collar 51 at the other end of the spring. Thus, spring 45 urges pin 37 upwardly in its bracket guideway or hole until the collar 51 engages the frame of the retainer. The other pins 35, 39 and 41 are similarly spring biased. Bracket 46 may be bolted to the placer tooling housing as seen in FIG. 1.

As the stepped coil form is incremented by vertical movement of shaft 12, coils of varying sizes are generated and in FIG. 4 it will be observed that the retainer pins engage the outermost or largest of these coils since the outermost coils have the greatest tendency to unwind or become displaced in the coil placer tooling, with this problem being particularly acute in two pole configurations such as illustrated in FIG. 4 where the outermost coils are subsequently to be placed in magnetic core slots which are nearly diametrically opposed. For a two pole stator, four pins are used and in general, for an n-pole stator, $2n$ pins would be employed. The pins are of course depressed by a stator core as at station 19 just prior to coil insertion. Upper ones of the these outermost coils also have a tendency to experience stress induced distortion in an axial direction, that is, perpendicular to the plane of FIG. 4 and this distortion may also be retarded by the coil retainer by providing wire spring members such as 53 for overhanging the outermost coils in a region near the finger pair between which those coils pass. Thus, springs such as 53 maintain the coils axially while pins such as 37 maintain the coils in position in the plane of FIG. 4.

Referring specifically to FIG. 2, during the winding process the flyer 11 dispenses wire in the plane generally illustrated by wire 55 and previous coil turns migrate down coil form 13 and off the end of that form into the coil placer tooling. Once a turn, such as 57, leaves the coil form 13 it may expand somewhat but is retained by pin 37. Once a turn such as 59 is beneath the free end of retainer spring 53, that turn will also be secured in the axial direction. Upon completion of the winding of a coil group, all of the turns may be positioned beneath spring 53 by downward movement of the outrigger 61 and stripper 79 as will be more fully understood in conjunction with the description of FIG. 8.

Figure 5:
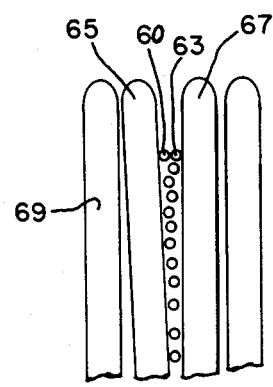
FIG. 5 illustrates distortion of the coil placer tooling finger elements frequently encountered in the prior art techniques.
Figure 6:
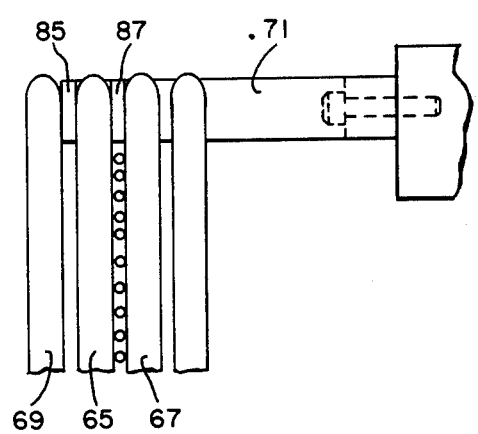
FIG. 6 is a view similar to FIG. 5 but depicting elimination of that distortion.
Figure 7:
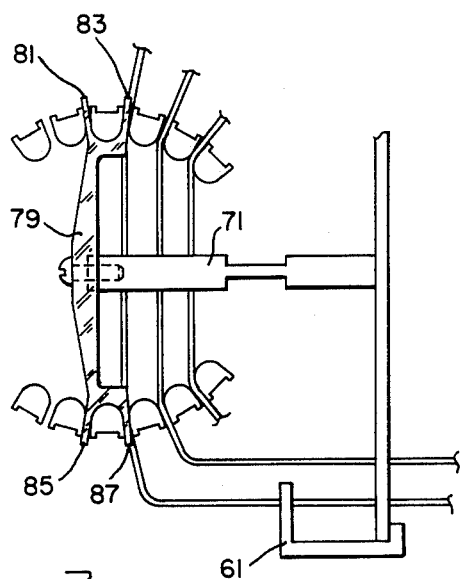
FIG. 7 is a plan view of a portion of the coil placer tooling and coil pusher as seen from the top of FIG. 6.

Once the winding of a pole group is completed, some turns of the coils may remain on coil form 13. To facilitate complete removal of the coils from the form and their proper positioning in the coil placer tooling, the coil form may include a coil pusher having portions with the same stepped configuration as the coil form but moveable generally perpendicular to the wire dispensing plane relative to the coil form to displace turns from the form. When that coil pusher displaces turns into the placer tooling, some distortion of the tooling may occur with this distortion being most noticeable in the spreading of a pair of adjacent placer tooling finger elements when the next adjacent slot between finger elements is not at the time also receiving wire as illustrated in FIG. 5. It will be noted in FIG. 5 that a turn such as 60 has been forced into position adjacent the turn such as 63 causing a spreading of the gap between the placer tooling elements 65 and 67 which is accentuated due to the fact that the gap between fingers 65 and 69 receives no coils at the present time. This, for example, might occur with the outermost or largest of the coils for a two pole machine as depicted in FIG. 4 wherein the slot between fingers 65 and 69 is intended to receive the outermost coil of the second pole group. Such flexing of the tooling blades may be reduced by employing the wire transfer assisting arrangement illustrated in FIGS. 6, 7 and 8.

When the winding of a pole group has been completed, a coil pusher including the coil stripping portions 71, 73 and 75 moves downwardly under the actuation of drive rod 77 to strip the remaining turns from the coil form and into the tooling. This transfer assisting arrangement includes the outrigger portions 61 and a centrally supported laterally extending member 79 having a pair of fins 81 and 83 and 85 and 87 at each of the opposed free ends thereof with each end passing between adjacent finger elements as the coil pusher urges coils toward and into the placer tooling. Thus fin 87 passes between the fingers or blades 65 and 67 while fin 85 passes between the blades 65 and 69. Thus, the fin pair 85 and 87 spans the single finger element 65. It will also be noted that one of each fin pair passes between adjacent pairs of finger elements which are receiving coils while the other of each fin pair passes between adjacent pairs of finger elements which are not receiving coils. Thus fin 87 is urging coils into the gap between finger elements 65 and 67 while fin 85 is functioning to preserve the gap between finger elements 65 and 69.

Figure 8:
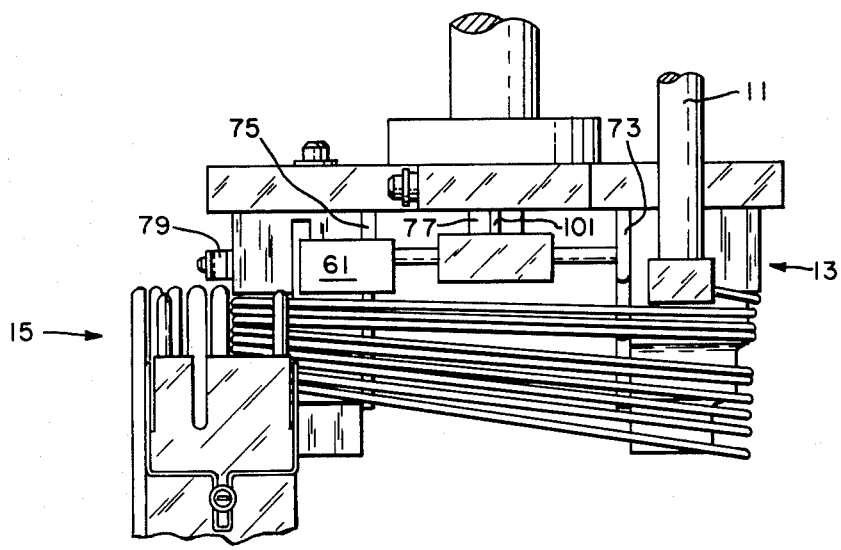
FIG. 8 is a side elevation view illustrating the coil form in its collapsed position and ready for the transfer of coils to be completed.
Figure 10:
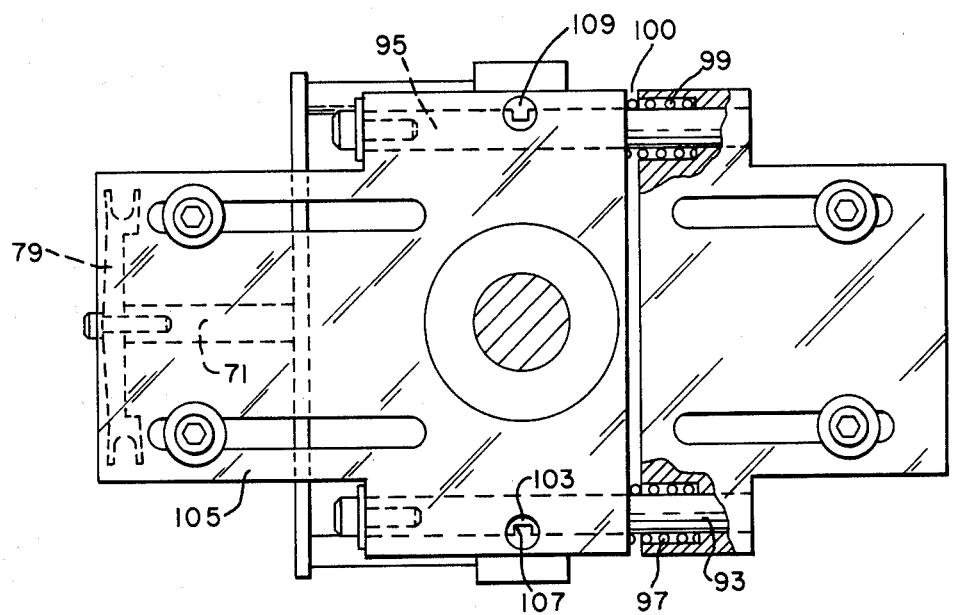
FIG. 10 is a plan view of the coil form and pusher of FIG. 9 as seen from the top thereof.
Figure 9:
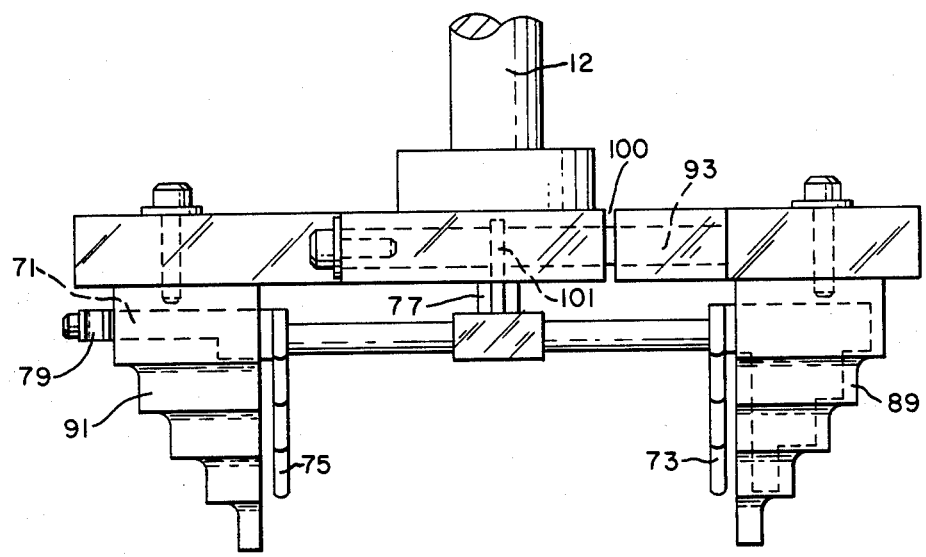
FIG. 9 is a side elevation view of the coil form.

Referring now primarily to FIGS. 8, 9 and 10, the coil form 13 will be seen to include two coil form portions 89 and 91 which are relatively slidable on the pins 93 and 95 between an expanded position as illustrated in FIGS. 9 and 10 and a collapsed position as illustrated in FIG. 8. Coil springs 97 and 99 bias the coil form toward its expanded position while the tension of coils positioned thereon tend to collapse the coil form. The coil form may be locked in its expanded position by a pair of pins such as 101 passing through a pair of openings 103 in the coil frame 105 and the notch 107 in pin 93. A similar pin which moves with the rod 77 may pass through corresponding openings 109 in the support plate 105 and a similar notch in pin 95. It will be noted that in the expanded position of the coil form these openings are aligned for receiving the pins such as 101 whereas when the coil form is collapsed, pins 93 and 95 have moved relative to the coil form support 105 so that the openings are misaligned. The coil springs 97 and 99 tend to align these openings. The collapse distance is relatively small as illustrated by the gap 100.

Thus, in operation while coils are being wound on the coil form that form is held in its extended or expanded configuration by pins such as 101 and upon completion of a pole group, the winding turns remaining on the coil form tending to urge that form toward its collapsed position are not effective to do so until downward movement of the drive rod 77 and corresponding motion of the transfer assisting arrangement extracts the pins 101 from their respective holes allowing the tension of the coils to collapse the form, slightly facilitating transfer of those coils from the coil form. Once the coils are free of the coil form, springs 97 and 99 re-expand the coil form and subsequent to coil transfer when the drive shaft 77 retracts, pins 101 again pass through the aligned holes locking the coil form in its expanded configuration.

From the foregoing it is now apparent that a novel arrangement for transferring coils and for retaining those coils on the device to which they are transferred has been disclosed meeting the objects and advantageous features set out herein before as well as others and that modifications as to the precise configurations, shapes and details may be made by those having ordinary skill in the art without departing from the spirit of the invention or the scope thereof as set out by the claims which follow.

What is claimed is:

1. In a device for forming and transferring coils to a coil placing machine for subsequent insertion into a slotted magnetic core of the type having a wire dispensing flyer rotatable about a coil form and coil placer tooling engaging the coil form to receive the formed coils, an arrangement for maintaining formed coils in position within the coil placer tooling comprising a plurality of spring biased pins located about the periphery of the coil placer tooling for restricting unwinding of the coils while those coils reside in the coil placer tooling.

2. The arrangement of claim 1 wherein the device is of the type where the flyer revolves in a fixed path defining a wire dispensing plane, the coil form is stepped and increments relative to the flyer to form coils of varying size and the wire migrates along the coil form and into the coil placer tooling while further coil turns are being formed on the coil form, the pins being spring biased generally normal to and toward the wire dispensing plane.

3. The arrangement of claim 1 wherein the pins are spring biased by at least one relatively fixed pin support bracket having pin guideways in which the pins may slide, means limiting pin motion along the guideways generally toward the coil form and flyer, and spring means urging respective pins toward their limiting position.

4. The arrangement of claim 3 wherein the pin support bracket is provided with resilient coil retaining means tending to restrict coil expansion axially toward the coil form and flyer.

5. The arrangement of claim 4 wherein the resilient coil retaining means comprises a wire spring member fastened to the pin support bracket with a free end thereof positioned to lie between some of the coil turns which are within the placer tooling and subsequent turns being generated by the flyer.

6. The arrangement of claim 1 wherein the spring biased pins extend into a region around the coil placer tooling which is to be occupied by a magnetic core during the placement of coils therein, positioning of the magnetic core on the coil placer tooling also displacing the spring biased pins against the biasing force and out of the region.

7. In a machine for positioning prewound coils in selected slots of a dynamoelectric machine core of the type having a plurality of generally parallel extending finger elements disposed in a generally circular pattern for supporting coils and engaging a core, and means moveable axially along the finger elements to engage and move the coils into the core, the improvement comprising yieldable coil retaining means positioned radially outwardly of the circular pattern of the finger elements and being in supporting engagement with certain ones of the coils, thereby reducing the likelihood of stress induced coil distortion prior to movement of the coils into a core.

8. The improvement of claim 7 wherein the yieldable means extends into a region normally occupied by a core when receiving coils from the finger elements and is displaced from that region by a core when that core is positioned to engage the finger elements.

9. The improvement of claim 8 wherein the yieldable means comprises a plurality of spring biased pins extending generally parallel to and disposed radially outwardly of the circular pattern of finger elements.

10. The improvement of claim 9 wherein the coils are to form pole windings of an n-pole dynamoelectric machine stator and 2n spring biased pins are disposed about the finger elements to retain the outermost of the coils of each pole winding.

11. The improvement of claim 7 wherein the yieldable means comprises resilient coil retaining means for retarding axial coil movement.

12. The improvement of claim 11 wherein the resilient coil retaining means comprises a wire spring member for overhanging certain of the coils in a region near an adjacent pair of finger elements between which the certain coils pass.

13. The improvement of claim 12 wherein the coil retaining means also extends into a region normally occupied by a core when receiving coils from the finger elements and is displaced from that region by a core when that core is positioned to engage the finger elements.

14. The improvement of claim 13 wherein the yieldable means further comprises a plurality of spring biased pins extending generally parallel to and disposed radially outwardly of the circular pattern of finger elements.

15. The improvement of claim 14 wherein the coils are to form pole windings of an n-pole dynamoelectric machine stator and 2n spring biased pins are disposed about the finger elements to retain the outermost of the coils of each pole winding.

16. The improvement of claim 7 wherein the yieldable means comprises means for restricting radial coil movement and means retarding axial coil movement.

17. The improvement of claim 7 further comprising a coil form engageable with certain ones of the finger elements, a wire dispensing flyer rotatable about the coil form for winding coils thereon, and means for transferring coils from the coil form to the finger elements.

18. The improvement of claim 17 wherein the means for transferring includes a coil pusher having a portion thereof for engaging and maintaining the separation between selected adjacent pairs of finger elements.

19. The improvement of claim 17 wherein the means for transferring includes a coil pusher having a portion thereof for ensuring that certain ones of the coils are engaged by the coil retaining means.

20. The improvement of claim 17 wherein the coil form is selectively collapsible to facilitate transfer of coils from the form to the finger elements.

21. The improvement of claim 20 wherein the means for transferring comprises a coil pusher extendible to urge coils into engagement with the finger elements and including means operable in a retracted position thereof to preclude collapse of the coil form.

22. The improvement of claim 20 further comprising spring means for urging the coil form toward an expanded coil receiving position, the spring force tending to expand the coil form being less than the force tending to collapse the form due to the presence of wound coils on the form.

23. In a device for forming and transferring coils to a coil placing machine for subsequent insertion into a slotted magnetic core of the type having a coil form, means for winding coils on the coil form, and coil placer tooling having finger elements for engaging the coil form to receive the formed coils, an improved wire transfer assisting arrangement comprising a coil pusher for engaging and urging coils from the form toward the coil placer tooling having a portion thereof for engaging and maintaining the separation between selected adjacent pairs of finger elements.

24. The improvement of claim 23 wherein the coil form is selectively collapsible to facilitate the transfer of coils from the form to the coil placer tooling.

25. The improvement of claim 24 wherein the coil pusher engages the coil form in one position to preclude collapse of the coil form.

26. The improvement of claim 24 further comprising spring means for urging the coil form toward an expanded coil receiving position, the spring force tending to expand the coil form being less than the force tending to collapse the form due to the presence of wound coils on the form.

27. The improvement of claim 23 further comprising yieldable coil retaining means adjacent the coil placer tooling for reducing the likelihood of stress induced coil distortion prior to insertion into a core.

28. The improvement of claim 27 wherein the coil pusher includes outrigger portions for forcing coil portions into the yieldable coil retaining means.

29. The improvement of claim 23 wherein the coil pusher portion comprises a centrally supported laterally extending member moveable with the coil pusher and having a pair of fins at each of the opposed free ends thereof with each fin passing between adjacent finger elements as the coil pusher urges coils toward the placer tooling.

30. The improvement of claim 29 wherein one of each fin pair passes between adjacent pairs of finger elements which are receiving coils while the other of each fin pair passes between adjacent pairs of finger elements not receiving coils.

31. The improvement of claim 30 wherein each fin pair spans a single finger element.

32. In a device for forming coils about a coil form and transferring those coils to a plurality of elongated finger elements for subsequent insertion in a slotted magnetic core of the type where the transfer of coil turns from the form and the forming of subsequent coil turns about the form is occurring at the same time, the improvement in the method of transferring the coils comprising collapsing the coil form upon completion of forming the coils to induce slack in any coils formed but not transferred and then completing the transfer of the coils.

33. The method of claim 32 including the step of maintaining the separation between certain adjacent pairs of finger elements during the completing step.

34. The method of claim 32 wherein the coil form is continuously biased to an expanded coil forming configuration with the tension in coils formed about the coil form but not yet transferred opposing that bias and including the step of precluding coil form collapse while coils are being formed.

35. The method of claim 34 wherein upon completion of coil transfer the continuous bias is effective to expand the form.

36. In a device for forming and transferring coils to a coil placing machine for subsequent insertion into a slotted magnetic core of the type having a wire dispensing flyer which revolves about a coil form in a fixed path defining a wire dispensing plane with coil placer tooling engaging the coil form and the coil form being stepped and moveable in increments relative to the flyer to form coils of varying size and with the wire migrating along the coil form and into the coil placer tooling while further coil turns are being formed on the coil form, the improvement wherein the coil form comprises at least two coil form portions relatively moveable between expanded and collapsed positions, means biasing the coil form toward the expanded position, means normally locking the coil form in the expanded position and temporarily releasable to allow the tension of coil turns on the form to collapse the form against the biasing force to aid completion of transfer of the coils to the coil placer tooling.

37. The improvement of claim 36 wherein the biasing means returns the coil form to the expanded position when the form is coil free.

38. The improvements of claim 36 further comprising means for transferring coils from the coil form to the coil placer tooling operable upon completion of the forming of coils to transfer coil turns remaining on the coil form therefrom.

39. The improvement of claim 38 wherein the coil form portions undergo relative sliding motion between the expanded and collapsed portions, the portions including a pair of openings which are aligned when the form is in the expanded position and misaligned when the form is in the collapsed position, the locking means comprising a protruding portion of the means for transferring which passes through the aligned pair of openings during the forming of coils.

40. The improvement of claim 36 further comprising means extending from the coil placer tooling toward the wire dispensing plane for restricting unwinding of the larger coils.

41. The improvement of claim 40 further comprising means for transferring coils from the coil form to the coil placer tooling operable upon completion of the forming of coils to transfer coil turns remaining on the coil form therefrom.

42. The improvement of claim 41 wherein the coil form portions undergo relative sliding motion between the expanded and collapsed portions, the portions including a pair of openings which are aligned when the form is in the expanded position and misaligned when the form is in the collapsed position, the locking means comprising a protruding portion of the means for transferring which passes through the aligned pair of openings during the forming of coils.

43. The improvement of claim 42 wherein the means for transferring includes outrigger portions for forcing portions of the larger coils into engagement with the means for restricting unwinding.

44. The improvement of claim 43 wherein the direction in which the coil form portions slide is generally parallel to the wire dispensing plane with the means for transferring being reciprocable along an axis generally perpendicular to the wire dispensing plane.

* * * * *